INVENTOR.
Seymour Zelnick
BY
ATTORNEY

United States Patent Office 3,299,251
Patented Jan. 17, 1967

3,299,251
TEMPERATURE CONTROL MEANS FOR ELECTRICALLY HEATED IMPULSE SEALING ELEMENTS
Seymour Zelnick, Toms River, N.J., assignor to Weldotron Corporation, Newark, N.J., a corporation of New Jersey
Filed June 10, 1964, Ser. No. 374,108
14 Claims. (Cl. 219—243)

This invention relates to new and improved temperature control means and, more particularly, to new and improved self-compensating temperature control means for controlling the temperature of the high temperature element used in impulse sealing.

A basic problem encountered in impulse sealing, i.e., sealing which essentially utilizes a short pulse of high current to rapidly heat a high resistance element to a temperature sufficient to weld thermoplastic film, resides in the fact that, if the cycling rate of the impulse sealing equipment is varied, the temperature of the sealing element will vary due to cumulative heat build-up effect notwithstanding the fact that the amplitude and duration of the current pulses flowed through the said element are maintained constant. It thus becomes desirable to provide means operable to sense the actual temperature of the element and to interrupt the flow of current therethrough when the element assumes a desired operating temperature. This has the effect of preventing the element from exceeding the desired operating temperature in spite of variations in cycling rate, and provides for longer element life.

A previously employed method for this purpose included the mounting of an adjustable micro-switch adjacent one end of the element whereby, when the element had expanded a predetermined amount, the micro-switch would be tripped to terminate the current pulse. This method did not prove particularly satisfactory because the sensitivity thereof was poor in that the micro-switch required a certain finite movement for actuation, and the impulse element developed a permanent elongation or "set" with use, to thus require continual positional readjustment of the micro-switch relative to the element in the "cold" condition of the latter to give proper control.

One object of the invention is to provide new and improved temperature control means by which these difficulties are obviated and to provide impulse sealing element temperature control means which are considerably more sensitive than those available heretofore.

Another object of my invention is the provision of impulse sealing element temperature control means which automatically compensate for permanent elongation of the element and are thus responsive only to true expansion thereof.

A further object of my invention is the provision of impulse sealing element temperature control means which require only the use of readily available components of proven dependability to furnish long periods of accurate, maintenance-free operation.

In a hereindisclosed preferred embodiment thereof, the impulse sealing element temperature control means of my invention comprise adjustable electrical contacts and a control circuit operatively associated therewith. The said control circuit is so arranged that when a first electrical contact carried by an expansion block at one end of the impulse sealing element is moved into contact with a second, adjustably positionable electrical contact due to expansion of the element, the heating current pulse to the said element is instantly terminated. Since the sensing of the expansion of the impulse sealing element requires only the establishment of an electrical contact, rather than the actuation of a mechanical member, the system is far more sensitive than the heretofore employed micro-switch system discussed above. To provide the self-compensating action referred to hereinabove, the adjustably positionable electrical contact is mounted on a support bracket which is in turn attached to the piston rod of a miniature piston-cylinder assembly. The said piston is of the spring-return type and the cylinder is supplied with oil from a small reservoir through a one-way flow control valve. The flow control valve is adjustable and is set to control the rate at which oil can flow from the cylinder back to the reservoir, but permits unrestricted flow in the opposite direction, i.e., from the reservoir to the cylinder. Thus, while the piston and piston rod can be rapidly withdrawn from the cylinder, the rate at which the spring will return the piston and piston rod to within the cylinder can be precisely set to a constant flow rate. In the "cold" or unheated condition of the impulse sealing element, the said expansion block exerts pressure on the support bracket and moves it to a proper starting position against the face of the said spring. When the element is momentarily heated to a high temperature by the pulsing of a high current there-through during a sealing cycle, it rapidly expands. Since the rate of travel of the piston into the cylinder is restricted to a very slow rate, as discussed above, the piston, and second electrical contact, will remain substantially stationary during this rapid element expansion, and therefore the first electrical contact will be moved into contact with the second electrical contact to discontinue the heating current pulse. However, as the element permanently elongates after a period of time, the piston, and second electrical contact, will be moved to constantly compensate therefor and provide a new starting point based on the said permanent elongation.

The above and other objects, features and advantages of my invention are believed made clear by the following detailed description thereof taken in conjunction with the accompanying drawings, wherein.

Figure 1:
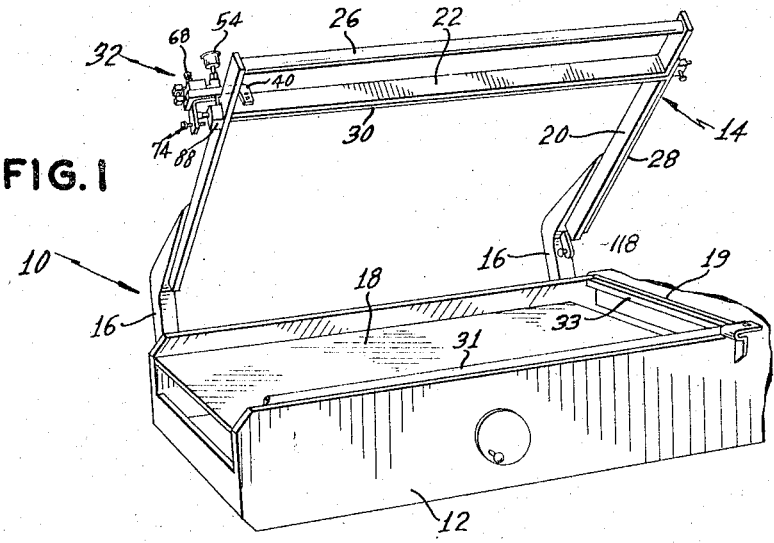
FIG. 1 is a perspective view of an impulse sealing machine utilizing the sealing element temperature control means of my invention.

In FIG. 1, an impulse sealing machine of the nature disclosed in U.S. Patent No. 3,047,991 is generally indicated at 10, and comprises a base portion 12 and a sealing assembly 14 pivotally mounted thereon by arms 16. The said base portion includes a support platform 18 for the support of articles to be packaged between thin films of thermoplastics as indicated at 19. The sealing assembly 14 comprises sealing bars 20 and 22, respectively, and an actuating handle 26. Impulse sealing elements 28 and 30 of suitable high electrical resistance material are positioned as shown on the sealing bars 20 and 22, respectively, and cooperate with backing members 31 and 33 to cut and seal the thin thermoplastic films therebetween. The said sealing elements are maintained at the proper operating temperature thereof by the temperature control means of my invention, which control means are generally indicated at 32. Briefly described, the operation of the said impulse sealer includes the positioning of an article to be packaged on the support platform 18 between the films 19 of any suitable thermoplastic material which are already joined together on two sides. The sealing assembly is then moved downwardly about arms 16 to bring the sealing elements into contact with the thin films to press the latter against the backing members. Concurrently therewith, the sealing elements are rapidly heated, by the passage of the current pulse therethrough, whereupon the films are cut and sealed along the lines of contact thereof with the sealing elements.

Figure 2:
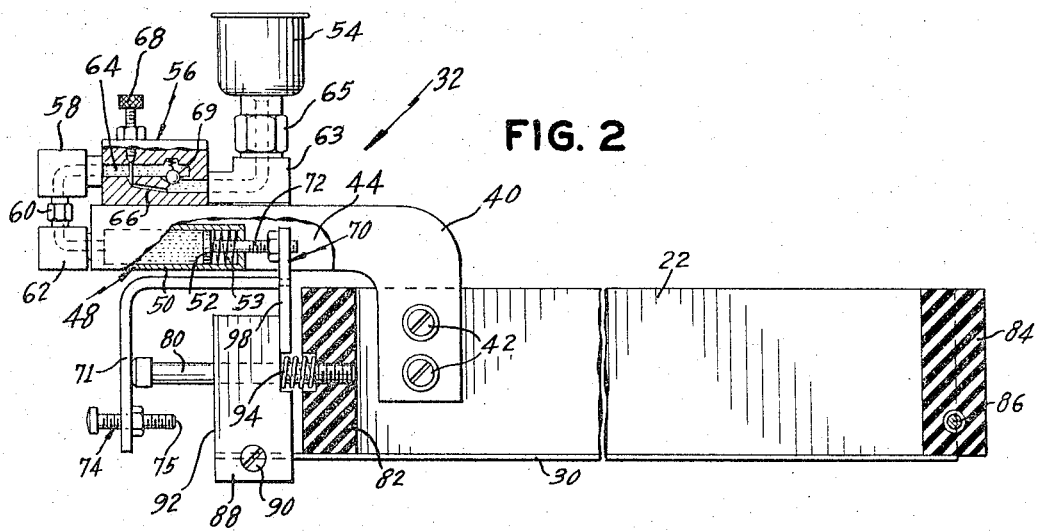
FIG. 2 is a side plan view, with portions cut away and parts in section for purposes of illustration, of the temperature control means of my invention.

Referring now to FIG. 2, a curved support bracket 40 is attached as shown by attachment screws 42 adjacent one extremity of the sealing bar 22, and includes an open chamber 44 formed therein. A piston-cylinder assembly 48 is positioned as shown within the said chamber and includes a cylinder 50 and a piston 52, spring biased as shown by spring 53, reciprocally mounted therewithin. An oil reservoir 54, flow control valve assembly 56, and conduit members 58, 60, 62, 63 and 65 are supported from the bracket and connected as shown to the cylinder whereby oil may flow between the reservoir and the cylinder.

The flow control valve assembly 56 includes a main flow passage 64 and a bypass 66 of much smaller cross-sectional area formed therein, and a readily adjustable needle valve 68 is provided to control the effective area of the bypass. A one-way ball check valve 69 is positioned as shown in the main flow passage 64 and functions to permit the substantially unrestricted flow of oil from the reservoir to the cylinder through the main flow passage, but to make impossible the flow of oil from the cylinder back to the reservoir through the said main flow passage. Thus such flow, if any, must take place through the much smaller bypass 66 subject to the adjustably restricting influence of the needle valve 68.

A contact-mounting bracket 70, of any suitable, electrically non-conductive material, is adjustably attached as shown to the connecting rod 72 of piston 52 so as to be movable therewith. An electrical contact 74 is screw-threadedly supported as shown by arm 71 of the mounting bracket 70, whereby the positioning of the remote extremity 75 of the said contact relative to the said bracket may be conveniently adjusted.

The sealing bar 22 includes insulators 82 and 84 positioned as shown at opposite extremities thereof. A guide shaft 80 extends as shown from insulator 82 at the adjacent extremity of the sealing bar 22 into contact with the surface of arm 71 of the mounting bracket to thus limit the movement of the latter toward the sealing bar. The impulse sealing element 30 is supported as shown from the insulators on the sealing bar 22 with one extremity of the element fixedly secured to insulator 84 by attachment screw 86 extending therebetween. The opposite extremity of the element passes over insulator 82 and is fixedly secured to an electrically conductive, element expansion block 88 by attachment screw 90 extending therebetween. The said expansion block is in turn slidably positioned as shown on guide shaft 80 by the projection of the said shaft therethrough. The expansion block constitutes an electrical contact with the area 92 thereof adapted to be moved into abutment with the adjacent extremity 75 of the electrical contact 74 to complete a circuit for discontinuing the supply of the heating current pulse to the impulse sealing element in a manner described in detail hereinbelow.

A biasing spring 94 is positioned as shown around guide shaft 80 between insulator 82 and expansion block 88 and functions to bias the latter away from the sealing bar toward the first contact to thus maintain the impulse sealing element 30 properly tensioned to prevent undesirable "drooping" thereof. Thus expansion of the impulse sealing element 30 due to the passage of the heating current pulse therethrough will result, through the action of biasing springs 53 (which acts on piston 52 and connecting rod 72) and 94 (which acts directly on the expansion block), in the movement of the expansion block along guide shaft 80 toward the extremity 75 of the electrical contact and eventual abutment therebetween. Conversely, contraction of the impulse sealing element due to the cooling thereof when the passage of the said heating current therethrough is discontinued, may be seen to result in movement of the expansion block away from the said electrical contact 74 against the combined forces of the said springs along guide shaft 80 toward the insulator 82 to the limit established by the abutment thereof with arm 98 of support bracket 70.

Figure 3:
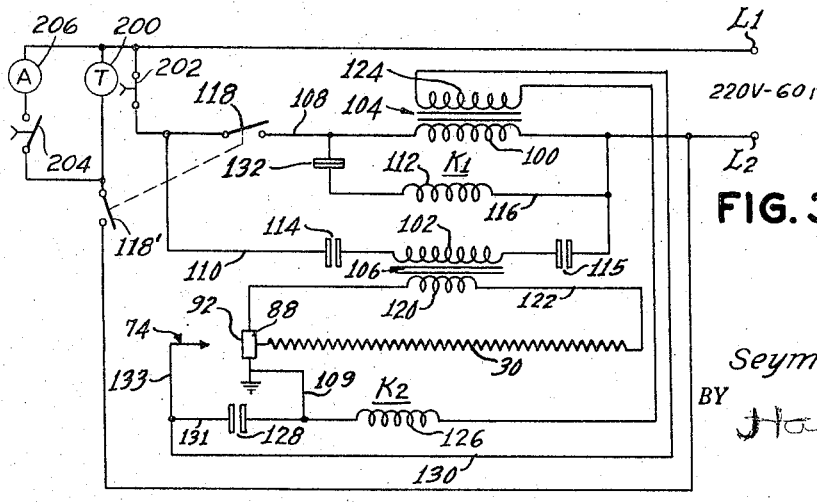
FIG. 3 is a schematic illustration of the control circuit of the temperature control means of my invention.

Referring now to the control circuit of FIG. 3, primary windings 100 and 102 of transformers 104 and 106, respectively, are connected as shown by leads 108 and 110 across lines $L_1$ and $L_2$. Coil 112 of relay $K_1$ is connected as show in parallel with transformer primary 100 across the said lines by lead 116. The said relay includes normally open contacts 114 and 115 connected as shown in series with transformer primary 102 in lead 110.

The secondary winding 120 of transformer 106, and the impulse sealing element 30 and expansion block 88, are connected in series in a loop by lead 122; while the secondary winding 124 of transformer 104, coil 126 of relay $K_2$ and the normally open contacts 128 of relay $K_2$ are connected in series as shown in a loop by leads 130 and 131. Leads 109 and 133 are connected as shown to the expansion block 88 and the electrical contact 74, respectively, and function to make possible the completion of the loop circuit of transformer winding 124 and relay coil 126 upon the abutment between the said block and contact despite the open condition of relay contacts 128. Relay $K_2$ further includes normally closed contacts 132 which are connected in lead 116 in series with coil 112 of relay $K_1$.

In commencing operation, the respective positions of any or all of needle valve 68 in bypass 66, bracket 70 relative to connecting rod 72, and the electrical contact 74 relative to the contact support bracket 70, are adjusted, if necessary, to establish relative starting positions for the expansion block 88 and the extremity 75 of the electrical contact 74 commensurate with the length at the starting point of the impulse sealing element 30. This length may change, over extended periods of use, due to permanent elongation or "set" of the said element in the manner discussed hereinabove. Utilization is then made of the impulse sealing element in the normal manner, i.e., the element is moved into contact with the thermoplastic films to press the latter against the backing member positioned below the element, and the heating current pulse passed through the element to cut and seal the said films.

The passage of the heating current pulse through the element is accomplished by the closing of the switch 118 which occurs automatically as indicated in FIG. 1, after the element has contacted the films to press the latter against the backing member. The said switch is connected in series as usual with the normally closed contacts 200 of a timer 202, which timer is energized by a second throw of the switch 118; and which interrupts the heating current pulse after the expiration of a predetermined period of time and has normally open contacts 204 in series with an alarm 206 to provide a signal to indicate that the actuating handle 26 should be raised. The temperature control means of my invention function to interrupt the heating current pulse if the sealing element exceeds the operating temperature thereof prior to the expiration of the predetermined period of time, and the following explanation of the operation thereof presupposes the occurrence of such condition. Closure of the said switch energizes the coil 112 of relay $K_1$ through leads 108 and 116, whereby the normally open contacts 114 and 115 of the said relay are closed to result in the energization of the primary winding 102 of transformer 106. Two sets of contacts, i.e. 114 and 115, are provided in line 110 to prevent arcing across the contacts as might occur if only one such contact set were utilized. Energization of the primary winding 102 of transformer 106 of course results in energization of the secondary winding 120 of the said transformer and attendant development of the heating current pulse of high amplitude in the impulse sealing element 30 through lead 122 in an obvious manner. Closure of switch 118 also results in the energization of the primary winding 100 of transformer 104 through lead 108. This, however, has no effect on the loop circuit of leads 130 and 131 due to the normally open contacts 128 of relay $K_2$ connected therein.

As the said heating current pulse passes through the said element, the latter of course expands rapidly whereupon the element expansion block 88 is moved along guide shaft 80 by spring 94 toward the adjacent extremity 75 of the electrical contact 74 to maintain the element in tension and prevent any "drooping" thereof. The interconnected piston 52, connecting rod 72, and contact mounting bracket 70 do not, however, immediately follow this movement under the force of biasing spring 53 on the said piston because of the operation of the one way ball check valve 69 in the main flow passage 64 of the flow control valve assembly 56, and the restriction of needle valve 68 in the bypass 66, which make impossible the sufficiently rapid flow of oil from the cylinder 50 to the reservoir 54 to enable rapid movement of the piston 52 into the said cylinder. Thus surface 92 of the expansion block soon abuts the extremity 75 of the electrical contact 74 to complete the loop circuit of leads 130, 133 and 109 therethrough. At this point, since the secondary winding 124 of transformer 104 is energized from the energized primary winding 100 of the said transformer through lead 108, the coil 126 of relay $K_2$ is energized through the said leads, the element expansion block 88 and the electrical contact 74, to in turn close the normally open contacts 128 of the said relay $K_2$ to complete a holding circuit therefor through leads 130 and 131. The energization of coil 126 of relay $K_2$ also opens the normally closed contacts 132 of the said relay in line 116 to result in the de-energization of coil 112 of relay $K_1$ which is connected in series with the said contacts in line 116. As relay coil 112 of relay $K_1$ is de-energized, normally open contacts 114 and 115 thereof are opened to in turn de-energize the primary winding 102 of transformer 106 which is connected in series therewith in lead 110. Thus the development of the heating current pulse in the impulse sealing element 30 through the secondary winding 120 of the said transformer 106 and lead 122 is discontinued whereupon the element begins to cool, and accordingly contract, to move the element expansion block 88 away from the electrical contact 74 against the force of spring 94 to break the circuit through the electrical contacts. The holding circuit for coil 126 of relay $K_2$ through the now closed contacts 128 thereof and leads 130 and 131 remains completed, whereby the relay remains energized and the normally closed contacts 132 thereof remain open to in turn maintain coil 112 of relay $K_1$ deenergized, and the normally open contacts 114 and 115 of relay $K_1$ open to prevent the further development of a heating current pulse in the impulse sealing element 30. Thus, it is not until switch 118 is momentarily opened to break the said holding circuit by discontinuing the energization of transformer 104 and of the coil 126 of relay $K_2$, that it becomes possible to again develop the said heating current pulse in the said element to repeat the cycle by the reclosing of the said switch.

Since the sealing element 30 contracts upon cooling at a rate which is of course slower than the rate at which the said element was heated by the passage of the heating current pulse therethrough, the effect of spring 53 on piston 52 will commence to register with very slow movement of the piston, and accordingly the contact mounting bracket 70, away from the sealing bar 22 against the above-described restricting effect of needle valve 68 in bypass 66. However, as the sealing element contracts, and the expansion block is pulled thereby in the direction opposite to the movement of the said bracket, the block will soon abut arm 98 of the bracket to reverse the movement of the piston 52 in the cylinder 50. The flow control assembly, of course, offers no resistance to this movement in that ball check valve 69 enables the free flow of oil from the reservoir back to the cylinder. However, as the sealing element elongates or develops a permanent "set" through use, the element expansion block will not be returned by the contraction thereof to the same position against the action of spring 94. Thus the expansion block will stop further away from insulator 82 of the sealing bar 22 with arm 98 of the contact mounting bracket 70 in abutment therewith in a corresponding new position due to the eventual effect of spring 53 on piston 52. Thus, the said elongation or permanent "set" of the sealing element is accurately and automatically compensated for and new starting positions provided for the element expansion block and first electrical contact which are perfectly commensurate with the new elongated length of the sealing element to insure continued accurate operation of the element temperature control means.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Automatic temperature control means for controlling the temperature of a heat-expansible element in response to the expansion of the element by controlling the heating thereof, comprising: circuit means including a heat-expansible element connected therein, transformer means coupled to an electrical source and operable when energized to pass a heating current of high amplitude through the element, first and second relatively movable electrical contact means, at least one of which is movable with the element upon the expansion thereof, relay means having contacts in circuit with said transformer and said source and operable when energized to de-energize said transformer means, said first and second contact means being operable upon abutment therebetween to de-energize said relay means to discontinue the passage of the heating current through the element, said contact means being relatively movable from spaced, first positions thereof when the element is in the unheated condition thereof to abutting, second positions of the contacts when the element is in the heated condition thereof, and means to maintain said first and second contact means spaced apart by a predetermined distance when the element is in the unheated condition thereof notwithstanding any permanent elongation which may develop in the element due to the heating thereof, and second relay means operable upon the energization thereof to maintain the first-mentioned relay means de-energized until said second relay means are de-energized, and switch means to de-energize said second relay means.

2. Automatic temperature control means for controlling the temperature of an elongated heating element which expands upon heating, comprising: support means; an elongated heating element fixed at one end thereof to said support means; means to supply energy to said heating element for conversion to heat; first biasing means coupled to said support means and to the other end of said heating element for providing tension on said element for maintaining said element taut; first electrical contact means carried by said element and movable with said other end thereof upon said expansion of said element; second electrical contact means coupled to said support means and spaced a given distance from said first contact means when said element is an unheated condition; control means coupled to said first and second contact means and said energy supply means for initially, when said first and second contact means are spaced apart, activating said energy supply means to supply energy to said element and, subsequently upon the closure of said first and second contact means, for deactivating said energy supply means to cease to supply energy to said element; and adjustment means coupled between said support means and said second contact means for adjusting said given distance.

3. Automatic temperature control means according to claim 2 wherein said adjustmenut means includes a first portion fixed to said support means and a second portion fixed to said second contact means, and an automatic compensation portion coupled to and between said first and second portions for moving said second contact means in the same first direction as said first contact means when said element is heating, but at a much slower velocity than said first contact means, and for permitting the moving of said second contact means in the same second direction as said first contact means when said element is cooling, at substantially the same velocity as said first contact means.

4. Automatic temperature control means according to claim 3 wherein said second portion of said adjustment means has a first subportion disposed in the path of travel of said first contact in said first direction and to which said second contact means is fixed, and a second subportion fixed to said first subportion and disposed in the path of travel of said first contact means in said second direction and which is engaged and moved by said first contact means in said second direction.

5. Automatic temperature control means according to claim 4 wherein said automatic compensation portion comprises a cylinder fixed to said first portion, a piston fixed to said second portion, a spring biasing said piston for movement in said first direction, and a fluid supply and valve means for coupling fluid into said cylinder for opposing but slowly yielding to movement of the piston with the bias of the spring in said first direction and for permitting free movement of the piston against the bias of the spring in said second direction when said second subportion of said second portion is engaged and moved by said first contact means.

6. Automatic temperature control means according to claim 5 wherein said valve means is a check valve permitting a relatively high volumetric rate of flow in said second direction and having a constricted bypass permitting a relatively low volumetric rate of flow in said first direction.

7. Automatic temperature control means according to claim 2 wherein said control means additionally includes timer operated switch means in circuit with said first and second contact means, said switch means being operable to provide a normal cycle of operation for said heating element having a predetermined normal duration, which normal duration is terminated by said closure of said first and second contact means.

8. Automatic temperature control means according to claim 2 wherein said adjustment means automatically follows the expansion of said heating element on heating and the subsequent contraction of said heating element on cooling to reset the spacing between said first and second contact means to said predetermined distance at the end of said contraction in each heating cycle notwithstanding any permanent elongation which may develop in said heating element.

9. Automatic temperature control means according to claim 2 wherein said adjustment means comprises second biasing means for moving said second electrical contact member away from said first contact member by an additional distance which is substantially equal to any permanent elongation of said heating element, and restrictive means coupled to said second biasing means and operable to substantially delay the operation thereof until said first biasing means has moved said first contact means towards said second contact means through a distance at least equal to the extent of the permanent elongation, said restrictive means comprising interconnected piston cylinder and fluid reservoir assemblies, with first and second fluid flow passageways extending therebetween, said first flow passageway allowing unrestricted flow of fluid from said reservoir to said cylinder and substantially no flow in the reverse direction, and said second flow passageway enabling only restricted flow of fluid from said cylinder to said reservoir, said second biasing means acting on said piston to move it into said cylinder against the effect of said restricted flow passageway in a direction corresponding to the movement of said second contact means away from said first contact means, said piston being fixed to and carrying said second contact means.

10. Apparatus for heating a workpiece, comprising: means for clamping the workpiece; electrical heating means for heating the clamped workpiece, said heating means having the characteristic of expanding with heat; electrical supply means; and control means including timing means for normally coupling said supply means to said heating means for a predetermined interval of time, and additional means for detecting the expansion of said heating means while it is providing heat and for overriding said timing means at any time prior to the end of the predetermined interval of time by decoupling said supply means if and when the expansion of said heating means reaches a predetermined distance.

11. Apparatus according to claim 10 wherein said heating means is a heating element and said additional means includes a first contact which is coupled to said heating element and is moved by the expansion of said heating element, a second contact which is disposed a predetermined distance from said first contact when said heating element is cold and which is approached by said first contact as said heating element expands, and means which are activated by the meeting of said first and second contacts, caused by the expansion of said heating element to the predetermined distance, to cause the decoupling of said supply means from said heating element.

12. Apparatus according to claim 11 wherein said heating element is an elongated band, one end of which is fixed to a support, the other end of which is biased to maintain said band taut; said first contact being mechanically connected to and movable with the band as it expands, said second contact being supported with respect to said support.

13. Apparatus according to claim 12 wherein one of said contacts is adjustable in its spacing with respect to the other of said contacts, whereby the spacing between said contacts when said heating element is cold may be made said predetermined distance, notwithstanding any changes in the dimensions of said heating element.

14. Apparatus for heating a workpiece, comprising: means for clamping the workpiece, electrical heating means for heating the clamped workpiece, including means having the characteristic of expanding with heat and expanding proportionally to the heat of the heating means; electrical supply means; and control means including timing means for normally coupling said supply means to said heating means for a predetermined interval of time, and additional means for detecting the expansion of said expanding means while the heating means is providing heat and for overriding said timing means at any time prior to the end of the predetermined interval of time by decoupling said supply means if and when the expansion of said expanding means reaches a predetermined distance.

(References on following page)

References Cited by the Examiner

UNITED STATES PATENTS

| | | | |
|---|---|---|---|
| 1,080,493 | 12/1913 | Smith | 219—514 |
| 1,594,158 | 7/1926 | Else | 219—512 |
| 1,964,732 | 7/1934 | Homan | 128—303.12 |
| 2,509,747 | 5/1950 | Sieter | 219—242 |
| 2,562,399 | 7/1951 | Trozmuller | 219—243 |

FOREIGN PATENTS 123,494  2/1919  Great Britain.

RICHARD M. WOOD, *Primary Examiner.*

C. L. ALBRITTON, *Assistant Examiner.*